Nov. 4, 1941.  F. P. WILLCOX  2,261,426
TILTING ROTATABLE TRIPOD HEAD
Filed Nov. 20, 1940     2 Sheets—Sheet 1
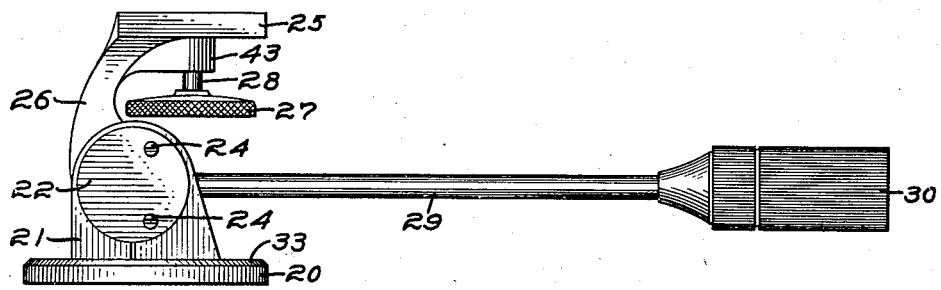
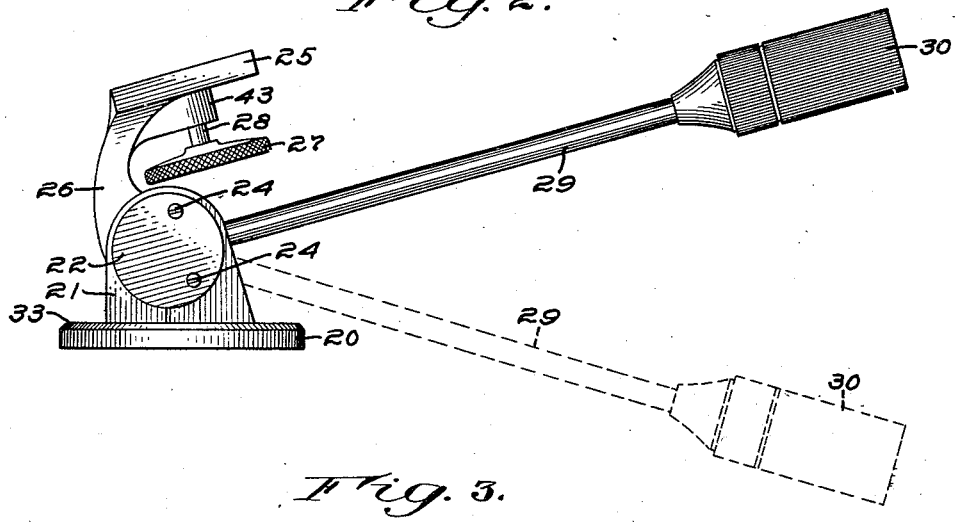
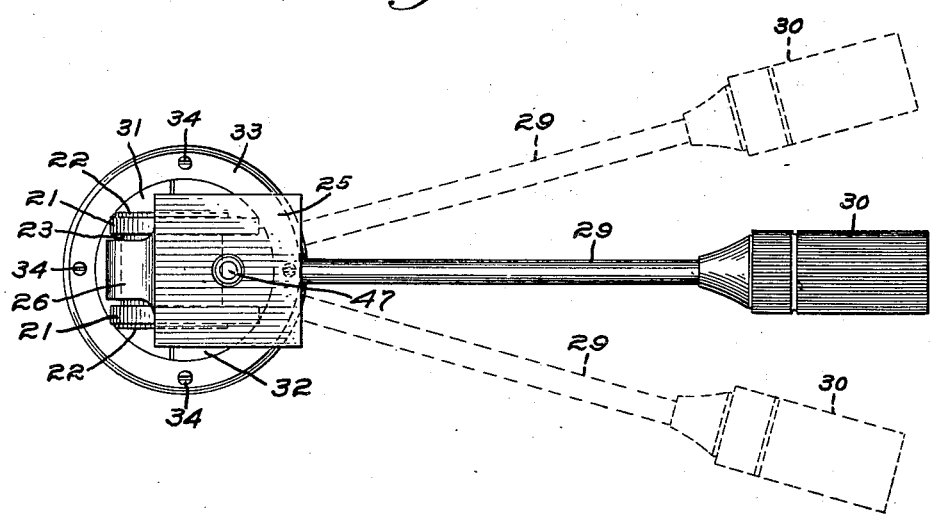
INVENTOR.
Frederick P. Willcox
BY
his ATTORNEYS.

Nov. 4, 1941.  F. P. WILLCOX  2,261,426
TILTING ROTATABLE TRIPOD HEAD
Filed Nov. 20, 1940  2 Sheets-Sheet 2
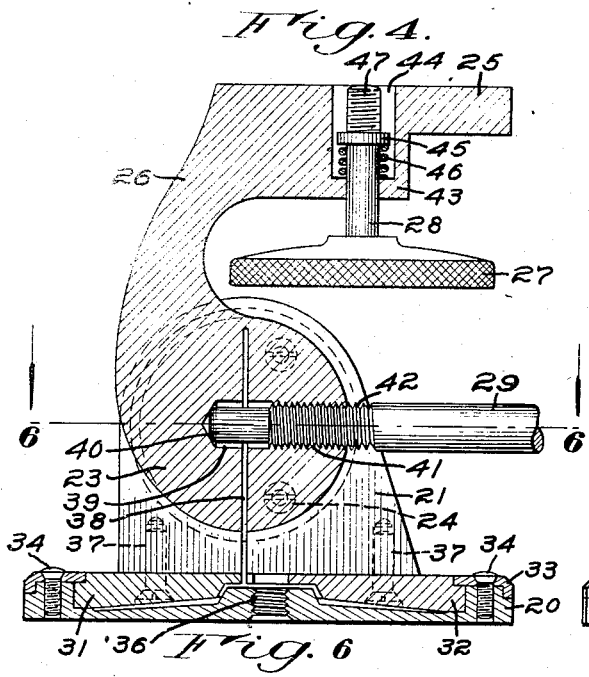
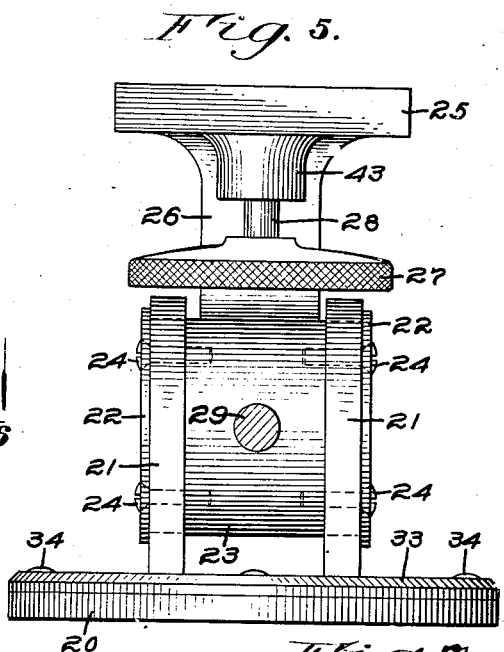
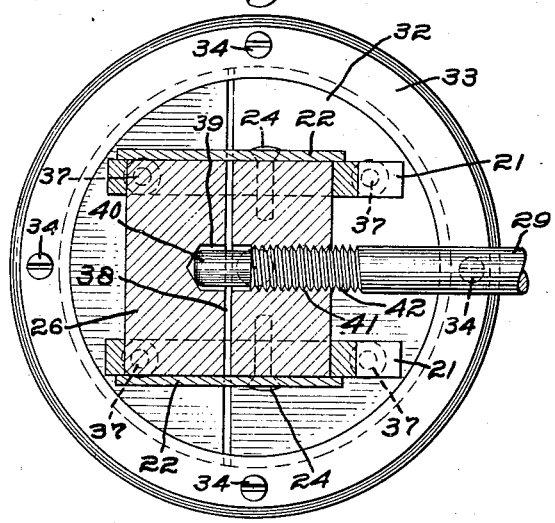
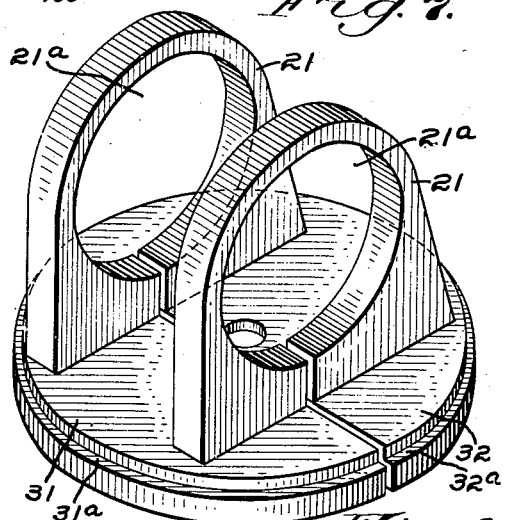
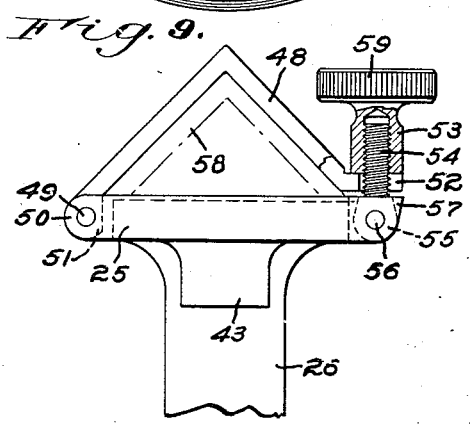
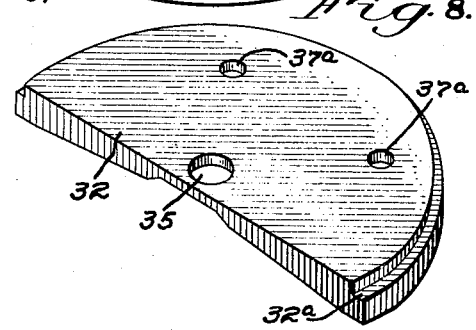
INVENTOR.
Frederick P. Willcox
BY
his ATTORNEY.

Patented Nov. 4, 1941

2,261,426

UNITED STATES PATENT OFFICE 2,261,426

TILTING ROTATABLE TRIPOD HEAD

Frederick P. Willcox, San Francisco, Calif., assignor to The Folmer Graflex Corporation, Rochester, N. Y., a corporation of Delaware Application November 20, 1940, Serial No. 366,395

9 Claims. (Cl. 248—183)

This invention relates to tilting and rotatable tripod heads for cameras and like purposes.

In order that the principle of my invention may be readily understood, I have disclosed a single embodiment thereof in the accompanying drawings, wherein—

Fig. 1 is a side elevation of the tripod head when in a horizontal position;

Fig. 2 is a side elevation of Fig. 1, but wherein the tripod head has been tilted in a forward direction;

Fig. 3 is a top plan view of Fig. 1, the handle being also shown in dotted lines to indicate the swinging of the tripod head either to the right or left;

Fig. 4 is a vertical cross sectional view of Fig. 1, showing the construction of the locking or clamping means, and showing the camera attaching screw;

Fig. 5 is a right-hand elevation of Fig. 1, the control arm or rod being cut off;

Fig. 6 is a transverse section through Fig. 4 on the line 6—6 thereof;

Fig. 7 is an isometric view of the tripod rotatable base member with the side plates attached thereto;

Fig. 8 is an isometric view showing one part of the rotatable base member; and

Fig. 9 is a fragmentary detail partly in vertical section, showing an alternative clamping means for the tripod head.

This invention includes means for controlling both the tilt and the rotation of the tripod head by means of a single control arm or member; means for locking the tripod head when tilted in any direction within the limits of the structure by means of the single control arm or member; and means for locking the tripod head in any position of rotation about the center axis of the tripod by using the same arm or controlling means; and many important objects of the invention are to provide a tripod head that can be manufactured from die-cast shapes with a minimum amount of machine work, thereby making it possible to manufacture at very low cost; to provide a tripod head, which, though small in size and relatively light, is very strong and rigid; to provide a tripod head that can readily be transported in the usual camera case; and to provide locking means functioning both on the tilting and on the rotating movement, for securely locking the head, even though the head is supporting a very heavy camera or other object.

Referring more particularly to the drawings and first to Figs. 1 to 8 thereof, a base member, desirably of circular disk-like form, is shown at 20, it being dished or recessed at its upper face for the reception of parts to be described, and from which upwardly extend side bearing members or plates 21, 21 which have large aligned through-openings 21a, 21a, at the outer faces of which respectively are retaining disks 22, 22 secured to the body portion 23 of a tilting tripod head casting by means of machine screws 24, 24. A tripod head table 25 of any suitable form and construction is attached to the said body portion 23 of the tripod head by means of a suitably shaped arm 26, and received in said table 25 is a camera or other object-attaching screw knob 27 permanently secured to the object-attaching screw 28. A suitable tripod-head control-arm or rod is shown at 29, which is provided with a suitable control handle 30.

The said base member 20 receives in the recess thereof, which is of true circular contour, two segmental disk-like rotatable members 31, 32, which together constitute a complete circular disk. They are, however, completely separated, or preferably completely separated, from each other, and in such condition are receivable in the said recess into which they tightly fit when expanded or forced apart, as will be described.

The said disk-like members 31, 32 are held in position in the said recess of the base member 20 by means of an overlying retaining ring 33 attached to said base 20 by screws 34, said retaining ring 33 fitting into stepped portions 31a, 32a of the segmental disk-like members 31, 32. One of said segmental disk-like members, and herein the member 32, is provided with a clearance hole 35 for the passage of the tripod attaching screw (not shown), and the said base member 20 is provided with a threaded hole 36 to receive such tripod screw.

The said side bearing members or plates 21, previously briefly referred to, are attached to both of the said segmental disk-like members 31, 32 in any suitable manner, as by means of four screws 37, best shown in Fig. 6, which pass through holes 37a, two of which are shown in Fig. 8, the said screws 37 being threaded into the bottom of the said side bearing plates 21, 21.

The body portion 23 of the tripod head is provided with two opposite, laterally extending, aligned, cylindrical portions (best shown in Fig. 5) which are received in the openings 21a, 21a of bearing members or plates 21, 21, being held in position therein by means of the said retaining disks or end plates 22, 22, as shown in Fig. 5. The body portion 23 of the tripod head is provided with a saw or like slot 38 extending partially and preferably nearly therethrough, as shown in Figs. 4 and 6.

A transverse hole or socket 39 is also provided in the body portion 23 of the tripod head to receive the inner end 40 of the said control arm or rod 29, so that the extreme inner end of the said rod 40 may bear against the inner end of the hole 39, which is threaded for a portion of its length, as indicated at 41, to receive the right-hand threaded portion 42 of the control arm or rod 29. When the said control arm or rod 29 is turned in a clockwise direction, the said body portion 23 of the tripod head will be caused to expand into the said side bearing members or plates 21, 21, because of the right-hand threaded portion 42 of the control arm or rod 29. Therefore, the said side bearing members or plates 21, 21, being attached to both of the disk-like segmental members 31, 32, are also caused to expand in the said recessed portion of the base member 20 so as to bind against the upright circular wall of the said recessed portion, thus binding, holding or locking the said disk-like members 31, 32 into said base member 20 and preventing them from turning therein, while at the same time the said body portion 23 of the tripod head is bound, held or locked from turning in the said through-openings 21a, 21a of the said side bearing members or plates 21, 21, thus holding all the parts in whatever position they had when the control arm or rod 29 was turned as described in a clockwise direction.

When the said control arm or rod 29 is turned in a contraclockwise direction, the said body portion 23 of the tripod head is allowed to become constricted or to contract which will also allow the said disk-like segmental members 31, 32 to become constricted or contract, thereby relieving pressure on the inner circular wall of the recessed portion of the base member 20. The tripod head can then be either tilted in an upright plane or be turned or rotated in a plane transverse thereto in the base 20 until the desired new position is obtained, whereupon the parts can then be locked by the turning of the control arm or rod 29 in a clockwise direction.

Referring particularly to Fig. 4, the tripod head table portion 25 is provided with a downwardly extending boss 43 having a counterbored hole 44 through which passes the camera or other article-attaching screw 28 that is provided with a retaining collar 45, under which is received a coiled spring 46 tending normally to thrust the article-attaching screw 28 in an upward direction. The upper end of the article-attaching screw 28 is provided with a threaded part 47 to engage the camera or other object to be held on the tilting tripod head. In Fig. 4, the attaching screw 28 for the camera or other object is shown as thrust downward against the spring 46, so that the camera or other object may slide freely over the table portion 25 and the spring 46 gives just sufficient pressure to cause the threaded end 47 of the screw 28 to engage the threaded opening when brought directly over the said threaded end 47.

Any suitable means may be provided to attach the camera or other object to the table portion 25, and in Fig. 9 I have shown as received upon the said table portion 25 a triangularly shaped clamping member 48 that is hinged by means of a pin 49 passing through a boss 50 of said table portion 25 and through a hinge portion 51 of the clamping member 48, the right-hand side whereof, viewing Fig. 9, is provided with a lip or projection 52 engaged by a clamping nut 53 threaded on an upright screw 54 having an enlarged head 55 through which transversely passes a pin 56 that also extends through a boss 57 of the said table portion 25. In the manner described, the camera bed indicated at 58 is clamped to the table portion 25 of the tripod head.

The structure shown may be used for any purpose for which a tripod may be employed. It is, however, particularly adapted for supporting cameras and especially a camera of the construction shown in my co-pending application Ser. No. 333,723, filed May 7, 1940.

Whereas it has been proposed in the prior art to employ in a tripod head a vertical pivot and a split horizontal pivot mounted thereon, and adapted to be clamped onto such vertical pivot, together with collars embracing the horizontal pivot and supporting the platform of the tripod, one of such collars being split and a single screw means being used to lock the parts against rotation upon either pivot, it will be clearly understood from the foregoing description of my invention that I do not employ any such construction, but, on the contrary, provide a simpler construction, the split body 23 of the tripod head being received in the split bearing members 21, 21 that are directly mounted upon the horizontally positioned split disk composed of the two segmental parts 31, 32 that are directly received in the base 20, which is provided with an encircling rim for said parts, preferably constructed by recessing said base as fully described, though any equivalent construction may be provided for the reception in the base 20 of the said split disk composed of the parts 31, 32.

Having thus described one illustrative embodiment of the invention, it is to be understood that although specific terms are employed, they are used in a generic and descriptive sense and not for purposes of limitation, the scope of the invention being set forth in the following claims.

I claim:

1. A tilting and rotatable tripod head for cameras and the like comprising, in combination, a base having a circular rim portion, a split circular disk received within said rim portion and adapted to be expanded thereagainst, a pair of upright expandible bearing members rigid with said disk, an expandible body portion of the tripod head transversely arranged in and turnable in said bearing members, and a single means for expanding said body portion of the tripod head in said bearing members and also said split circular disk within the rim of said base, said single means being received in said expandible body portion of the tripod head.

2. A tilting and rotatable tripod head for cameras and the like comprising, in combination, a base having a circular rim portion, two segmental disk members together constituting a circular disk and receivable within the circular rim of said base, upright bearing members each carried by both of said disk segments, an expandible body portion of the tripod head received in said body member, and a single means for expanding said body portion of the tripod head in said bearing members and also for spreading apart said disk segments within the rim of said base.

3. A tilting and rotatable tripod head for cameras and the like comprising, in combination, a base having a circular rim portion, an expandible circular disk received within said rim portion and adapted to be expanded thereagainst, upright bearing members carried by said expandible disk, a body portion of the tripod head received in said bearing members, said body portion being partially split through, one part of the body portion at one side of the split having an unthreaded socket and the other part at the other side of the split having a threaded opening in alignment with said socket, and a threaded control arm receivable in said socket and opening for expanding said body portion of the tripod head.

4. A tilting and rotatable tripod head for cameras and the like comprising, in combination, a base having a circular rim portion, an expandible circular disk received within said rim portion and adapted to be expanded thereagainst, upright bearing members carried by said expandible disk, an expandible body portion of the tripod head received in said bearing members, said body portion having a table-like extension for receiving thereon a camera or other object to be supported, and means for expanding said body portion of the tripod head in said bearing members and also said disk within the rim of the base.

5. A tilting and rotatable tripod head for cameras and the like comprising, in combination, a base having a circular recess, a circular disk received within said circular recess and adapted to be expanded against the perimeter thereof, a retaining ring secured to said base and overlying the peripheral portion of said disk, upright bearing members carried by said disk, a body portion of the tripod head received and manually turnable in said bearing members, and means for expanding said circular disk of the tripod head against the perimeter of said circular recess of the base.

6. A tilting and rotatable tripod head for cameras and the like comprising, in combination, a base having a circular rim portion, two disk segments received within said rim portion and together constituting a complete circular disk, said segments being adapted to be spread against said rim, two parallel upright bearing members split at their lower parts and positioned transversely of and secured at their lower edges to both of said disk segments, an expandible body portion of the tripod head received in said bearing members, and a single means for expanding said body portion of the tripod head in said bearing members and for spreading said disk segments into binding relation with said circular rim of the base.

7. A tilting and rotatable tripod head for cameras and the like comprising, in combination, a base having a circular rim portion, an expandible circular disk received within said rim portion and adapted to be expanded thereagainst, upright bearing means carried by said disk, an expandible body portion of the tripod head received in said bearing means, and a single means for expanding said body portion of the tripod head in said bearing means and also said circular disk within the rim of said base.

8. A tilting and rotatable tripod head for cameras and the like comprising, in combination, a base having a circular rim portion, an expandible circular disk received within said rim portion and adapted to be expanded thereagainst, upright bearing members carried by said expandible disk, an expandible body portion of the tripod head received in said bearing members, said body portion having a table-like extension for receiving thereon a camera or other object to be supported, means for securing a camera or like object to the said table-like extension, and means for expanding said body portion of the tripod head in said bearing members and also said disk within the rim of the base.

9. A tilting and rotatable tripod head for cameras and the like including in sub-combination, a base having a circular recess, a circular disk received within said circular recess and adapted to be expanded against the perimeter thereof, upright bearing members carried by said disk and formed for receiving for turning movement therein, a body portion of the tripod head so that such body portion is manually turnable in said bearing members, and means for expanding said circular disk of the tripod head against the perimeter of said circular recess of the base.

FREDERICK P. WILLCOX.